(12) United States Patent
Ramberg et al.

(10) Patent No.: US 10,511,605 B2
(45) Date of Patent: Dec. 17, 2019

(54) METHOD FOR SECURING ELECTRONIC DATA BY RESTRICTING ACCESS AND TRANSMISSION OF THE DATA

(71) Applicant: Bottomline Technologies (DE), Inc., Portsmouth, NH (US)

(72) Inventors: Fred Ramberg, North Hampton, NH (US); Trevor Ramberg, North Hampton, NH (US)

(73) Assignee: Bottomline Technologies (de), Inc., Portsmouth, NH (US)

( * ) Notice: Subject to any disclaimer, the term of this patent is extended or adjusted under 35 U.S.C. 154(b) by 233 days.

(21) Appl. No.: 15/170,048

(22) Filed: Jun. 1, 2016

(65) Prior Publication Data

US 2016/0359858 A1 Dec. 8, 2016

Related U.S. Application Data

(60) Provisional application No. 62/171,716, filed on Jun. 5, 2015.

(51) Int. Cl.
*H04L 9/00* (2006.01)
*G06F 21/00* (2013.01)
*H04L 29/06* (2006.01)
*G06F 21/62* (2013.01)
*G06F 21/60* (2013.01)

(52) U.S. Cl.
CPC .......... *H04L 63/101* (2013.01); *G06F 21/606* (2013.01); *G06F 21/6209* (2013.01); *H04L 63/0428* (2013.01); *H04L 63/107* (2013.01); *G06F 2221/2143* (2013.01)

(58) Field of Classification Search
CPC ..................................................... H04L 63/101
See application file for complete search history.

(56) References Cited

U.S. PATENT DOCUMENTS

| 2011/0055907 A1* | 3/2011 | Narasimhan | H04L 41/046 726/5 |
|---|---|---|---|
| 2012/0151553 A1* | 6/2012 | Burgess | G06F 21/00 726/1 |
| 2014/0366159 A1* | 12/2014 | Cohen | G06F 21/31 726/28 |
| 2016/0352759 A1* | 12/2016 | Zhai | H04L 63/1416 |

\* cited by examiner

*Primary Examiner* — Jeffrey Nickerson
*Assistant Examiner* — Syed M Ahsan
(74) *Attorney, Agent, or Firm* — Richard A. Baker, Jr.

(57) ABSTRACT

A method for securing data by embedding the data in a data structure and utilizing a sensor to detect transfer of the data structure. The data is embedded such that the data is only accessible by first executing an executable program. If the executable program determines that the device attempting to access the data (the accessing device) does not have permission to access the data, then the executable program destroys the data. If the data structure is transferred to another device, a sensor positioned to detect the data structure when transferred will identify the data. If the sensor determines that the data structure is not permitted to be transferred, then the sensor destroys the data.

17 Claims, 4 Drawing Sheets

METHOD FOR SECURING ELECTRONIC DATA BY RESTRICTING ACCESS AND TRANSMISSION OF THE DATA

RELATED APPLICATIONS

This application claims the benefit of U.S. Application No. 62/171,716 filed on Jun. 5, 2015. Which is herein incorporated by reference in its entirety.

TECHNICAL FIELD

The present invention relates to data security and, more particularly, to a method and system for securing electronic data in a data structure.

BACKGROUND OF THE INVENTION

Electronic data is commonly used to store important information such as healthcare and financial data. As the amount of electronic data has dramatically increased over the past decade, so have the number of data breaches, resulting in billions of private records being stolen. For this reason, much research has gone into improved methods of securing data.

Current methods for protecting data generally utilize sophisticated encryption schemes and/or multi-factor authentication in order to ensure that only authorized users gain access to the data. These current methods "trigger" on "who" is accessing the data and the current methods are typically constructed and deployed as "layers" of security starting potentially as true physical layers at the perimeter and culminating as encrypt/decrypt schemes. The current methods for protecting data generally have the disadvantage of (1) making data hard to get to, (2) making data difficult to utilize without a key, and (3) complicating access for authorized users by breaking data apart, storing the data in pieces at different locations, and distributing assembly instructions to authorized users.

SUMMARY OF THE INVENTION

A new method for protecting data is needed that does not impose additional burdens on users and system administrators.

The present disclosure provides a method for securing data by embedding the data in a data structure such that the data is only accessible by first executing an executable program and by using a sensor positioned to detect the data structure when transferred, where the executable program and sensor are configured, respectively, to destroy the data if the data structure is not permitted to be accessed or transferred, from a particular location, as opposed to by a particular entity.

According to one aspect of the disclosure, there is provided a system for securing electronic data. The system includes an executable program stored on a non-transitory computer readable medium of an accessing device and configured to be executed by a processor of the accessing device. The system also includes a data structure stored on a non-transitory computer readable medium of a host device. The data structure comprising an identifier and embedded data accessible only by first executing the executable program. The executable program when executed determines if the accessing device attempting to access the embedded data has permission to access the embedded data. If the accessing device is determined not to have permission to access the embedded data, the executable program destroys the embedded data. If the accessing device is determined to have permission to access the embedded data, the executable program allows the host device to access the embedded data. The system further includes a sensor positioned to detect the data structure when transferred from the host device to a receiving device outside of a predefined area. The sensor is configured to: detect the identifier of the data structure when the data structure is transferred from the host device to a receiving device and access a permission table associating each of a plurality of identifiers with a permission regarding transfer and determine a permission associated with the identifier. If the permission associated with the identifier indicates that the data structure is permitted to be transferred to the receiving device, then the sensor is configured to allow the data structure to be transmitted to the receiving device. If the permission associated with the identifier indicates that the data structure is not permitted to be transferred to the receiving device, then the sensor is configured to destroy the embedded data.

Alternatively or additionally, the executable program is embedded in the data structure.

Alternatively or additionally, the sensor destroys the embedded data by setting a flag of the data structure to an armed state and the executable program destroys the embedded data if the flag is set to an armed state.

Alternatively or additionally, the sensor allows the data structure to be transmitted to the receiving device by setting the flag of the data structure to a disarmed state and the executable program allows the embedded data to be accessed if the flag is set to the disarmed state.

Alternatively or additionally, the flag is set by default to the armed state.

Alternatively or additionally, the flag is set by default to the disarmed state.

Alternatively or additionally, the executable program determines if the accessing device has permission to access the embedded data by: determining at least one of an identity or a location of the accessing device attempting to access the embedded data and determining a permission associated with the identifier. If the permission associated with the identifier indicates that the data structure is permitted to be accessed by the accessing device, then the executable program allows the embedded data to be accessed. If the permission associated with the identifier indicates that the data structure is not permitted to be accessed by the accessing device, then the executable program destroys the embedded data.

Alternatively or additionally, the executable program determines the permission associated with the identifier by: connecting to a predetermined server and accessing a permission table stored on the predetermined server. The permission table associates each of a plurality of identifiers with a permission regarding access.

Alternatively or additionally, when the executable program is executed by the accessing device and the executable program determines that the accessing device does not have permission to access the embedded data, then the executable program determines an identity of the accessing device and transfers the identity of the accessing device to a predetermined server.

Alternatively or additionally, the embedded data is destroyed by setting each bit of the embedded data to zero or one.

Alternatively or additionally, the embedded data is destroyed by overwriting each bit of the embedded data with random data.

Alternatively or additionally, the embedded data is destroyed by first setting each bit of the embedded data to zero or one and then overwriting each bit of the embedded data with random data.

Alternatively or additionally, the system further includes a network for transferring the data structure between the host device and the receiving device.

Alternatively or additionally, the sensor comprises a packet analyzer.

Alternatively or additionally, the network comprises at least one of a TCP/IP network or a system bus.

Alternatively or additionally, the predefined area is a local area network.

According to another aspect of the disclosure, there is provided a data structure stored on a non-transitory computer readable medium of a host device and configured to secure electronic data. The data structure includes an identifier and embedded data accessible only by first executing an executable program. The executable program when executed determines if an accessing device attempting to access the embedded data has permission to access the embedded data. If the accessing device is determined not to have permission to access the embedded data, the executable program destroys the embedded data. If the accessing device is determined to have permission to access the embedded data, the executable program allows the accessing device to access the embedded data.

Alternatively or additionally, the executable program is embedded in the data structure.

Alternatively or additionally, the executable program is configured to determine if the accessing device has permission to access the embedded data by: determining at least one of an identity or a location of the accessing device attempting to access the embedded data and determining a permission associated with the identifier. If the permission associated with the identifier indicates that the data structure is permitted to be accessed by the accessing device, then the executable program is configured to allow the embedded data to be accessed. If the permission associated with the identifier indicates that the data structure is not permitted to be accessed by the accessing device, then the executable program is configured to destroy the embedded data.

Alternatively or additionally, the executable program determines the permission associated with the identifier by: connecting to a predetermined server and accessing a permission table stored on the predetermined server. The permission table associates each of a plurality of identifiers with a permission regarding access.

According to a further aspect of the disclosure, there is provided a method for securing electronic data. The method includes embedding data to be secured in a data structure such that the embedded data is not accessible without first executing an executable program. The data structure is stored in a non-transitory computer readable medium of a host device. The method also includes determining if an accessing device has permission to access the embedded data. If the accessing device is determined not to have permission to access the embedded data, the method destroys the embedded data. If the accessing device is determined to have permission to access the embedded data, the method allows the accessing device to access the embedded data. The method additionally includes transferring the data structure to a receiving device and, during transfer of the data structure, detecting an identifier of the data structure using a sensor. The method further includes accessing a permission table associating each of a plurality of identifiers with a permission regarding transfer and determining a permission associated with the identifier. If the permission associated with the identifier indicates that the data structure is permitted to be transferred to the receiving device, the method allows the data structure to be transmitted to the receiving device. If the permission associated with the identifier indicates that the data structure is not permitted to be transferred to the receiving device, the method includes destroying the embedded data.

A number of features are described herein with respect to embodiments of this disclosure. Features described with respect to a given embodiment also may be employed in connection with other embodiments.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

DETAILED DESCRIPTION OF THE INVENTION

Figure 3:
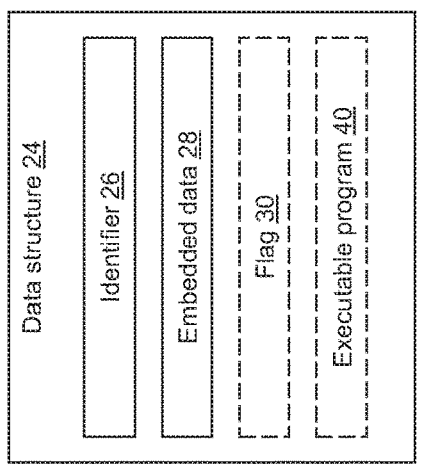
FIG. 3 is a block diagram of one embodiment of a data structure.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present disclosure provides a method for securing data by embedding the data in a data structure and utilizing a sensor to detect transfer of the data structure. The data is embedded such that the data is only accessible by first executing an executable program. If the executable program determines that the device attempting to access the data (the accessing device) does not have permission to access the data, then the executable program destroys the data. If the data structure is transferred to another device, a sensor positioned to detect the data structure when transferred will identify the data. If the sensor determines that the data structure is not permitted to be transferred, then the sensor destroys the data.

Figure 1:
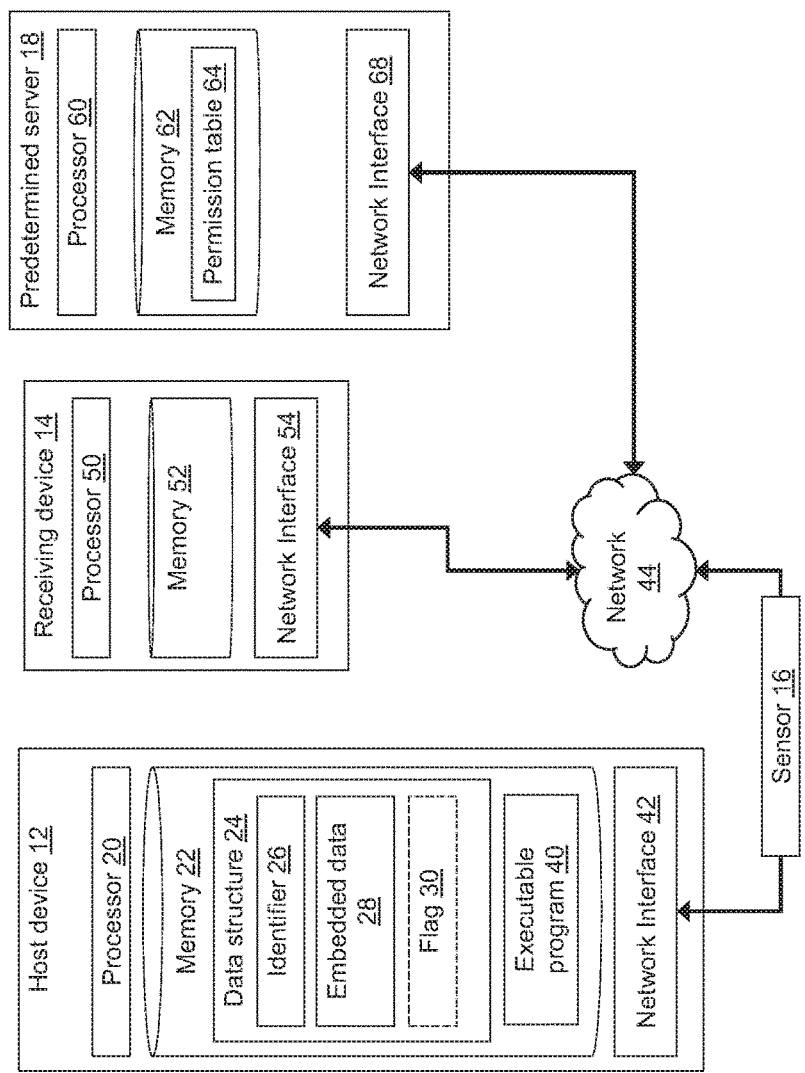
FIG. 1 is a block diagram representing a system for protecting electronic data utilizing a data structure.

FIG. 1 depicts a system 10 for securing electronic data. The system 10 includes a host device 12 and a sensor 16. The system 10 may also include a receiving device 14 and a predetermined server 18. The host device 12 includes a memory 22 storing a data structure 24 and an executable program 40. The executable program 40 is executed by a processor 20 of the host device 12. The data structure 24 includes an identifier 26 and embedded data 28. The host device 12 may additionally include a network interface 42 for transferring the data structure 24 to the receiving device 14 via a network 44.

If a user of the host device 12 attempts to access the data structure 24, the executable program 40 is executed before the host device 12 is provided access to the embedded data 28. In this way, a user is unable to access the embedded data 28 prior to the executable program 40 determining whether the user has permission to access the data. If the user does not have permission to access the embedded data 28, then the embedded data 28 is destroyed.

As shown in FIG. 1, the sensor 16 is positioned to detect the data structure 24 when transferred to the receiving device 14. When the data structure 24 is transferred from the host device 12 to the receiving device 14, the sensor 16 detects the identifier 26 of the data structure 24. The sensor 16, then determines if the data structure 24 is permitted to be transferred to the receiving device 14. If the data structure 24 is not permitted to be transferred to the receiving device 14, then the embedded data 28 is destroyed.

The predetermined server 18 may be a computer system of one or more servers. The host device 12 and/or receiving device 14 may comprise a cellular phone, smart phone, tablet, mobile computer, desktop computer, laptop, or any other suitable computer apparatus capable of executing the executable program 40 and sending or receiving a data structure 24. The host device 12, receiving device 14, and predetermined server 18 each include at least a processor, a network interface, and non-transitory computer readable medium. The computer readable medium may include encoded thereon instructions for interfacing with the corresponding network interface and reading and writing data to the corresponding computer readable medium. The computer readable medium may also include computer programs comprising instructions embodied thereon that are executed by the corresponding processor.

Figure 2:
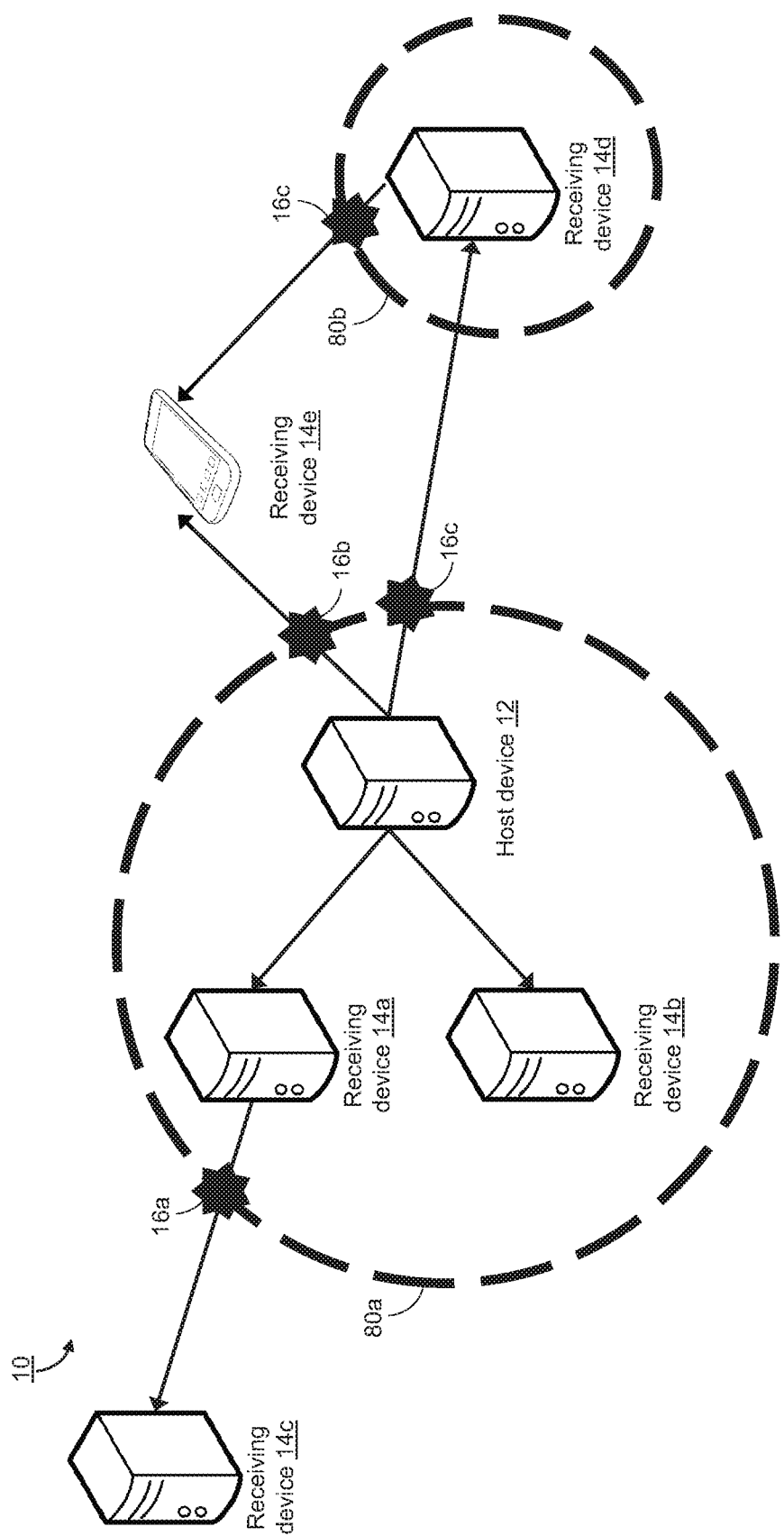
FIG. 2 is a diagram illustrating the protection of data within the system of FIG. 1.

FIG. 2 depicts communication of data between a host device 12 and multiple receiving devices 14a-e. In the figure, two predefined areas 80a, 80b are shown. In this example, the predefined areas 80a, 80b comprise a local area network (LAN). When the host device 12 transfers the data structure 24 to either of the two receiving devices 14a, 14b located within the LAN 80a, the data structure 24 does not pass in front of a sensor 16. Rather, the data structure 24 is simply passed to the receiving devices 14a, 14b. However, when the data structure 24 is passed outside of the LAN 80a, the data structure 24 passes by the sensor 16 and is detected. The sensor 16 then determines whether the data structure 24 has permission to be transmitted to the intended receiving device 14c-e and either destroys the embedded data 28 or allows the data structure 24 to be transmitted to the receiving device 14c-e.

As will be understood by one of ordinary skill in the art, the predefined areas 80 are not limited to a single LAN, but may comprise any suitable network of devices. For example, the predefined areas 80 may comprise a collection of LANs, a Bluetooth Network, etc.

With further reference to FIG. 2, the data structure 24 may be transferred from one LAN 80a to another LAN 80b. In this example, the host device 12 transfers the data structure 24 to the receiving device 14d located within another LAN 80b. The data structure 24 passes in front of a sensor 16c when exiting the LAN 80a before reaching the receiving device 14d. Then, when receiving device 14d transmits the data structure 24 to the receiving device 14e located outside of the LAN 80b, the data structure 24 again passes in front of a sensor 16c.

As will be understood by one of ordinary skill in the art, the transmission of a data structure 24 may be transmitted using any suitable protocol (e.g., TCP/IP, Bluetooth, SMTP, HTTP, SSL, PPP, IMAP, or any other suitable network protocol).

Turning back to FIG. 1, the data structure 24 is stored on a non-transitory computer readable medium 22 of the host device 12. The data structure 24 includes an identifier 26. The identifier 26 may be a value or key stored within the data structure 24. Alternatively, the identifier 26 may instead be determined from the data structure 24. That is, the identifier 26 may not be a value or key stored within the data structure 24, but may instead be determined from properties of the data structure 24. For example, in this example, the identifier 26 may be determined from the bits representing the data structure 24, the overall size of the data structure 24, from accessible data stored within the data structure 24, and/or using any suitable manner for identifying electronic data.

As described above, the embedded data 28 is accessible only by first executing an executable program 40. The executable program 40, when executed, determines if an accessing device attempting to access the embedded data 28 has permission to access the embedded data 28. The executable program 40 may determine if the accessing device has permission to access the embedded data 28 by determining at least one of an identity or a location of the accessing device attempting to access the embedded data and by determining a permission associated with the identifier 26. For example, the executable program 40 may determine the permission associated with a given data structure 24 based on the identifier 26 of the data structure 24. The executable program 40 may determine the permission by connecting to a predetermined server 18 and accessing a permission table 64 stored on the predetermined server 18. The permission table 64 associates each of a plurality of identifiers with a permission regarding access. In this example, the executable 40 may locate the identifier 26 of the data structure 24 within the permission table 64. The permission associated with the identifier 26 may specify a list of approved devices that are approved to access the embedded data 28 within a given location. In this example, the listed approved devices would not have permission if located outside the given location.

The processor of the host device 12 and/or receiving device 14 may identify the location of the corresponding device using a global positioning system (GPS) device, cellular triangulation, WI-FI positioning, or any other suitable technique or device to determine location.

Accessing device refers to any device attempting to access the data structure 24. For example, the accessing device may be the host device 12 and/or the receiving device 14.

As shown in FIG. 3, the executable program 40 may be embedded in the data structure 24. Alternatively, the executable program 40 may be external to the data structure 24. Even when not embedded in the data structure 24, the embedded data 28 is only accessible by first executing the executable program 40. In both examples (embedded and external), the executable program 40 may be initiated and executed when a user attempts to access the embedded data 28. Alternatively, in both examples (embedded and external), the executable program 40 may be run as a background process that is kept running even when a user is not accessing or attempting to access a data structure 24. In one embodiment, a check is performed when a user attempts to access a data structure 24 to determine if the executable program 40 is currently running and, if it is determined that the executable program 40 is not running, the executable program 40 is initiated and executed.

If the accessing device is determined to have permission to access the embedded data 28, then the executable program 40 allows the accessing device to access the embedded data 28. As described above, the permission may be determined using the permission table 64. In this example, if the permission associated with the identifier 26 indicates that the data structure 24 is permitted to be accessed by the accessing device, then the executable program 40 is configured to allow the embedded data 28 to be accessed. Accessing the embedded data 28 may comprise allowing the embedded data 28 to be loaded into a program.

Conversely, if the accessing device is determined not to have permission to access the embedded data 28, the executable program 40 destroys the embedded data 28. As described above, the permission may be determined using the permission table 64. In this example, if the permission associated with the identifier 26 indicates that the data structure 24 is not permitted to be accessed by the accessing device, then the executable program 40 is configured to destroy the embedded data.

The executable program 40 may destroy the embedded data 28 by setting each bit of the embedded data 28 to zero or one or by overwriting each bit of the embedded data 28 with random data. The executable program 40 may decide between setting each bit of the embedded data 28 to zero or one or overwriting each bit with random data based on time constraints. For example, it is more difficult to recover data overwritten with random data than it is to recover data overwritten with either zeroes or ones. For this reason, it is preferable to overwrite the embedded data 28 with random data. However, it is more time consuming to overwrite with random data. Depending on the timing involved, a malicious user may stop the overwriting with random data before the embedded data 28 is destroyed, allowing the malicious user to recover the embedded data 28 that was not yet overwritten. For this reason, the embedded data 28 may be destroyed by first setting each bit of the embedded data to zero (or one) and then overwriting each bit of the embedded data with random data. In this way, the embedded data 28 is first overwritten quickly and then the embedded data 28 is more thoroughly overwritten. In this example, if a malicious user interrupts the overwriting with random data, then the data has still been overwritten with zeroes or ones.

When the executable program 40 is executed by the accessing device and the executable program 40 determines that the accessing device does not have permission to access the embedded data, then the executable program 40 may determine an identity of the accessing device. After determining the identity of the accessing device, the executable program 40 may transfer the identity of the accessing device to a predetermined server 18. The executable program 40 may additionally transfer the identifier 26 of the data structure 24 to the predetermined server 18. In this way, the predetermined server 18 may be informed when a data structure 24 is acquired by an unauthorized device, as well as what data structure 24 has been acquired by the unauthorized device. The predetermined server 18 may then add the unauthorized device to a black list of known unauthorized devices. If the unauthorized device is a device that is permitted to access some data structures 24, then this access may be revoked.

Depending on the information passed to the predetermined server 18 by the executable program 40, the predetermined server 18 may pass the location of the unauthorized device to the authorities, revoke access privileges of the host device 12 that provided the data structure 24 to the unauthorized device, or perform any other suitable actions. In this way, the data structure 24 can be used to not only prevent unauthorized access to embedded data 28, but also to determine the device and/or user attempting to access the data structure 24 without authorization and/or determine the source of leaks of data to unauthorized users/devices.

As described above, the system 10 may additionally include one or more sensors 16. Each sensor is positioned to detect the data structure 24 when transferred from the host device 12 to a receiving device outside of a predefined area 80. For example, the sensor 16 may comprise a separate device from the host device 12 or a component of the host device 12. In one example the sensor 16 is a packet analyzer or other computer device attached to the network 44 (i.e., the network the host device 12 is attached to) and configured to analyze traffic passing through the network 44. In another example, the sensor 16 may comprise software, hardware, or a combination thereof located within the host device 12. For example, the sensor 16 may comprise a program executed by the processor 20 of the host device 12 that is configured to monitor output ports (e.g., USB, Ethernet, Bluetooth, WIFI, serial, parallel, etc.).

The sensor 16 is configured to detect the identifier 26 of the data structure 24 when the data structure 24 is transferred from the host device 12 to a receiving device 14. When the sensor 16 is located outside of the host device 12, the detection by the sensor 16 may be performed after the data structure 24 has been transmitted by the host device 12. Alternatively, when the sensor 16 is a component of the host device 12, the detection by the sensor 16 may be performed before the data structure 24 has left the host device 12. For example, when the sensor 16 comprises a program executed by the processor 20 of the host device 12, the sensor 16 may detect that a user of the host device 12 is attempting to email the data structure 24 to a receiving device 14.

The data structure 24 may be transferred over a network 44 connecting the host device 12 and the receiving device 14. The network 44 may be at least one of a TCP/IP network or a system bus. For example, when a user attempts to transfer a data structure 24 via a USB port, the network 44 would comprise the system bus connecting the USB port and the memory 22 of the host device 12.

After the sensor 16 detects the identifier 26 of a data structure 24 being transferred, the sensor 16 accesses a permission table 64 associating each of a plurality of identifiers with a permission regarding transfer. Using the permission table 64, the sensor 16 determines a permission associated with the detected identifier 26. For example, the permission table 64 may specify for a given identifier that the associated data structure 24 is permitted to be transferred to a list of authorized devices.

If the permission associated with the detected identifier indicates 26 that the data structure 24 is permitted to be transferred to the receiving device 14, then the sensor 16 is configured to allow the data structure 24 to be transmitted to the receiving device 14. The sensor 16 may allow the data structure 24 to be transmitted to the receiving device 14 by setting a flag 30 of the data structure 24 to a disarmed state. When an accessing device attempts to access a data structure 24 with a flag 30 in the disarmed state, the executable program 40 is configured to allow the embedded data 28 to be accessed if the accessing device is determined to have permission to access the data structure 24. Alternatively, the sensor 16 may allow the data structure 24 to be transmitted to the receiving device 14 by simply not interfering with the transmission (i.e., allowing the transmission to proceed).

If the permission associated with the identifier 26 indicates that the data structure 24 is not permitted to be transferred to the receiving device 14, then the sensor 16 is configured to destroy the embedded data.

The sensor 16 may be configured to destroy the embedded data 28 by setting a flag 30 of the data structure 24 to an armed state. When an accessing device attempts to access a data structure 24 with a flag 30 in the armed state, the executable program 40 destroys the embedded data 28. The executable program 40 may be configured to destroy embedded data 28 having a flag 30 in an armed state independent of whether the accessing device is determined to have permission to access the embedded data 28. Alternatively, the executable program 40 may first determine if the accessing device has permission to access the embedded data 28 and destroy the embedded data 28 only if the accessing device does not have permission to access the embedded data 28.

Depending on the security level associated with a given data structure 24, the flag 30 may be set by default to armed, disarmed, or an undefined (e.g., NULL) state. If the flag 30 is set by default to armed and a user is able to transfer the data structure 24 to an accessing device without the data structure 24 being detected by the sensor 16, then the data structure 24 will destroyed by the executable program 40 when the accessing device attempts to access the data structure 24. The data structure 24 would be destroyed in this example, because the flag 30 would be set to armed and the executable program may be configured to destroy the embedded data 28 when the flag is set to armed. In this example, if the data structure 24 was transferred to an authorized receiving device 14 in front of a sensor 16, then the flag would have been changed to disarmed.

Alternatively, the sensor 16 may be configured to destroy the embedded data 28 itself by setting each bit of the embedded data 28 to zero or one or by overwriting each bit of the embedded data 28 with random data. That is, in this embodiment, the embedded data 28 has been destroyed before the data structure 24 reaches the receiving device. When the sensor 16 is a component of the host device 12, the embedded data 28 may be destroyed by the processor 20 of the host device 12. Alternatively, the embedded data 28 may be destroyed by removing it from the data structure 24 such that the data structure 24 received by the receiving device 14 does not contain any representation (e.g., replaced with zeroes, ones, or random data) of the embedded data 28. When the sensor 16 is separate from the host device 12, the sensor 16 may include a processor (not shown) that destroys the embedded data 28 before allowing the data structure 24 to continue to the receiving device 14. This embodiment may have improved security, because the embedded data 24 has already been destroyed before it reaches the receiving device 14 and, for this reason, there is less likelihood that a malicious user will be able to obtain the embedded data 24.

In another example, the sensor 16 may prevent the data structure 24 from reaching the receiving device 14. That is, the sensor 16 may detect the attempted transmission of the data structure 24 from the host device 12 to the receiving device 14 and terminate the transmission. When the sensor 16 is a component of the host device 12, the processor 20 of the host device 12 prevents the data structure 24 from being transmitted by instructing the network interface 42 not to transmit the data structure 24. When the sensor 16 is separate from the host device 12, the sensor 16 may include a processor (not shown) that reroutes the data structure 24 such that the data structure 24 does not reach the receiving device 14. In one example, the sensor 16 reroutes the data structure 24 by simply deleting the data structure 24.

Figure 4A:
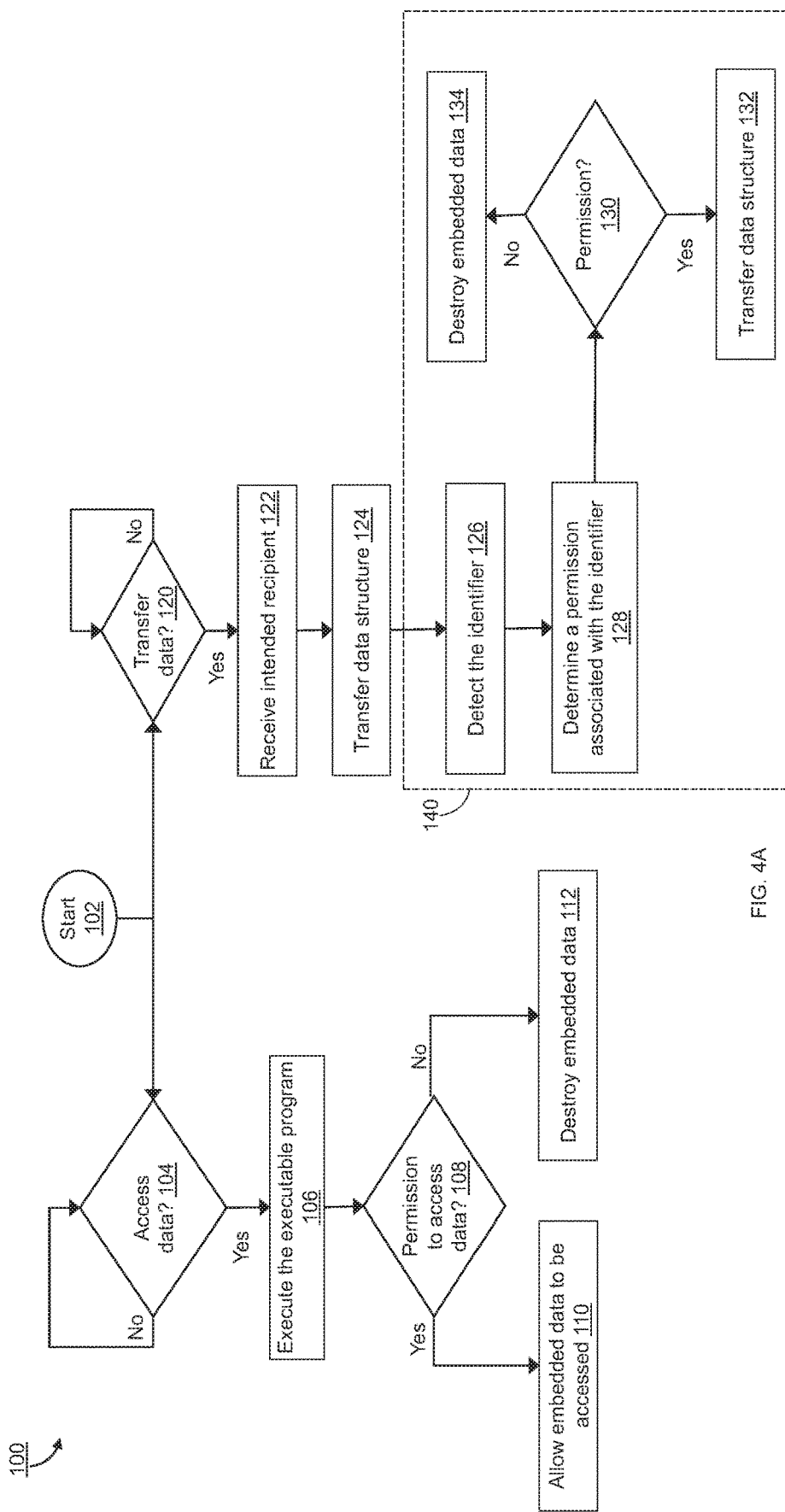
FIG. 4A is flow diagram representing a method for protecting electronic data when an executable program is executed when the data is accessed.

Turning to FIG. 4A, a block diagram is shown depicting a method 100 for securing electronic data when an executable program 40 is executed when the data is accessed. The portion of the method 100 contained within the dashed box 140 may be performed by the sensor 16 and the remainder of the method 100 may be performed by the host device 12 (e.g., the processor 20 of the host device 12).

Prior to beginning the method in process block 102, the electronic data to be secured is embedded in a data structure 24 such that the embedded data 28 is not accessible without first executing the executable program 40. The data structure 24 is stored in a non-transitory computer readable medium 22 of a host device 12.

Following the start of the method 100 in process block 102, the method 100 splits into two separate paths. The first path, beginning with decision block 104, concerns accessing the embedded data 28 stored within the data structure 24. The second path, beginning with decision block 120, concerns transferring the data structure 24 to a receiving device 14. The two paths may be performed simultaneously.

In decision block 104, the method determines if an accessing device is attempting to access the data structure 24. If the accessing device is not attempting to access the data structure 24, then processing returns to decision block 104. However, if the accessing device is attempting to access the data structure 24, then the method continues onto process block 106. In process block 106, the executable program 40 is executed.

In decision block 108, the executable program 40 determines if the accessing device 12 has permission to access the embedded data 28. If the accessing device is determined to have permission to access the embedded data, the accessing device is allowed to access the embedded data 28. If the accessing device is determined not to have permission to access the embedded data in decision block 108, then the embedded data 28 is destroyed in process block 112.

In decision block 120, the method determines if the host device 12 is attempting to transfer the data structure 24. If the host device 12 is not attempting to transfer the data structure 24, then processing returns to decision block 120. However, if the host device 12 is attempting to transfer the data structure 24, then the method 100 continues onto process block 122. In process block 122, the intended recipient of the data structure 24 is determined (e.g., received). In process block 124, the host device 12 transfers the data structure 24 to a receiving device 14 (i.e., the intended recipient).

In process block 126, during transfer of the data structure 24, the identifier 26 of the data structure 24 is detected by the sensor 16. In process block 128, a permission associated with the identifier 26 is determined. As described above, the permission may be determined by accessing a permission table associating each of a plurality of identifiers with a permission regarding transfer.

In decision block 130, it is determined whether the receiving device 14 has permission to receive the data structure 24 and/or whether the host device 12 has permission to transfer the data structure 24. If the permission associated with the identifier 26 indicates that the data structure 24 is permitted to be transferred to the receiving device 14, then the data structure is allowed to be transmitted to the receiving device 14 in process block 132. However, if the permission associated with the identifier 26 indicates that the data structure 24 is not permitted to be transferred to the receiving device 14, then the embedded data 28 is destroyed in process block 134.

Figure 4B:
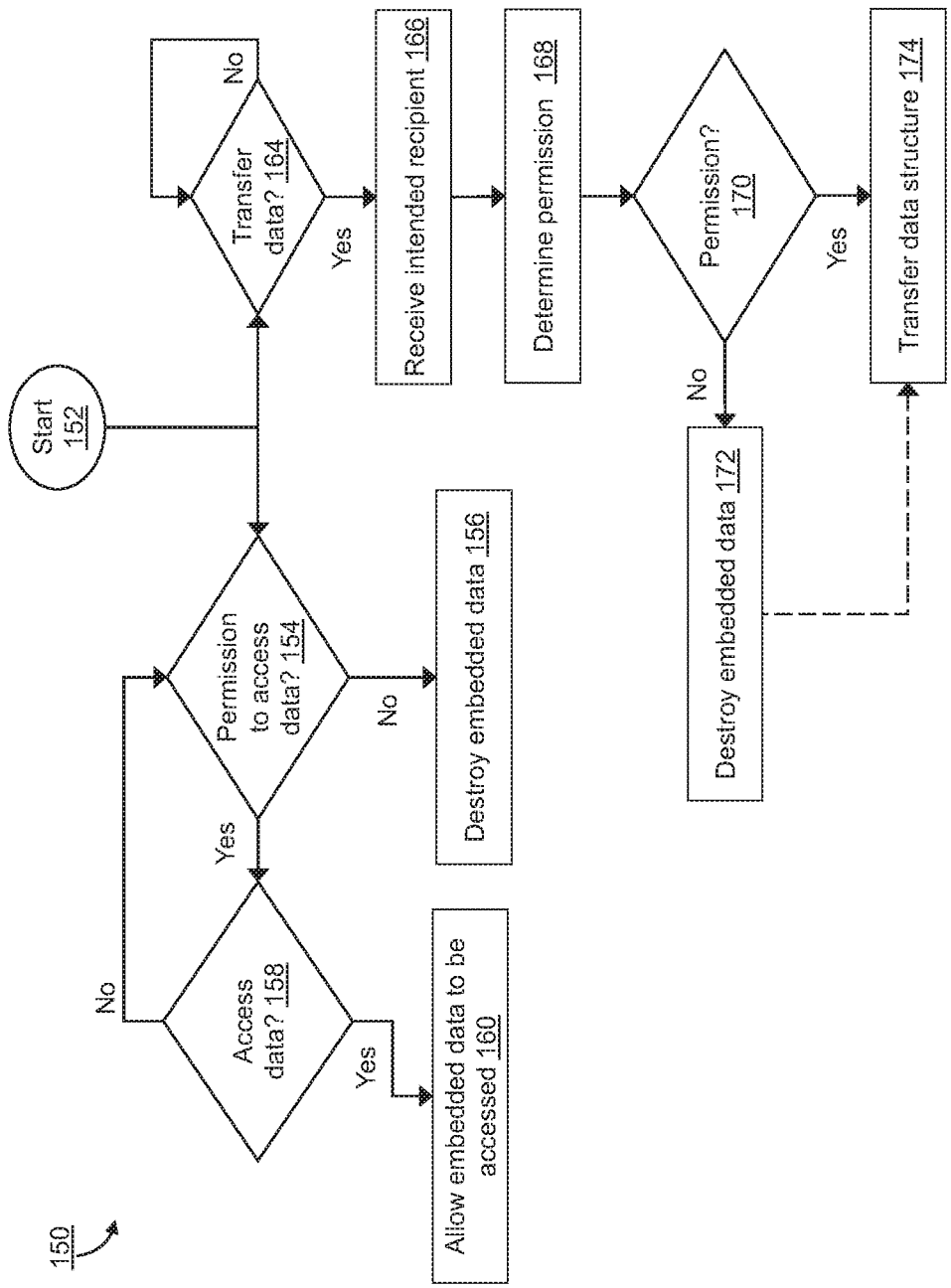
FIG. 4B is flow diagram representing a method for protecting electronic data when an executable program is running as a background process.

Turning to FIG. 4B, a block diagram is shown depicting a method 150 for protecting electronic data when an executable program 40 is running as a background process. As in FIG. 4A, following beginning the method 150 in process block 152, the method 150 splits into two separate paths. The first path, beginning with decision block 154, concerns accessing the embedded data 28 stored within the data structure 24. The second path, beginning with decision block 164, concerns transferring the data structure 24 to a receiving device 14. The two paths may be performed simultaneously.

In decision block 154, the executable program 40 determines if the host device 12 (where the data structure 24 is stored) has permission to access the data structure 24. If the host device 12 does not have permission, then the embedded data 28 is destroyed in process block 156.

In this embodiment of the method 150, the executable program 40 is running as a background process. In one example, permission to access the data structure 24 is dependent on the location of the host device 12. For example, the host device 12 may be an employee's laptop that has permission to access a given data structure 24 while the laptop is located within the LAN of a company. But, the laptop does not have permission to access the data structure 24 when the laptop is located outside the LAN of the company (e.g., at home). In this example, the executable program 40 monitors the location of the host device 12 and, when the executable program 40 detects that the host device 12 has left the LAN of the company, the executable program 40 destroys the embedded data 28. For example, if the employee downloads the data structure 24 to her laptop within the LAN of the company, the employee will be permitted to access the embedded data 28. If at the end of the day the employee takes her laptop home and attempts to access the data at home, she will find that the embedded data 28 has been destroyed. The data will be destroyed, because the method will detect in decision block 154 that the laptop no longer has permission to access the data structure 24 and the embedded data 28 will be destroyed.

If the host device 12 has permission to access the data structure 154, then processing moves to decision block 158. In decision block 158, the executable program 40 determines whether the host device 12 is attempting to access the embedded data 28. If the host device 12 is not attempting to access the embedded data 28, then processing returns to decision block 154. However, if the host device 12 is attempting to access the data, then the executable program 40 allows the embedded data 28 to be accessed in process block 160.

In decision block 164, the executable program 40 determines if the host device 12 is attempting to transfer the data structure 24. If the host device 12 is not attempting to transfer the data structure 24, then processing returns to decision block 164. If the host device 12 is attempting to transfer the data structure 24, then the intended recipient is received in process block 166. In process block 168, a permission associated with the data structure 24 is determined. As described above, the permission may be determined based on an identifier 26 of the data structure 24.

In decision block 170, it is determined whether the receiving device 14 has permission to receive the data structure 24 and/or the host device 12 has permission to transfer the data structure 24. If the permission associated with the data structure 24 indicates that the data structure 24 is permitted to be transferred to the receiving device 14, then the data structure 24 is allowed to be transmitted to the receiving device 14 in process block 174. However, if the permission associated with the data structure 24 indicates that the data structure 24 is not permitted to be transferred to the receiving device 14, then the embedded data 28 is destroyed in process block 172. Optionally, after destroying the embedded data 28, the data structure 24 (including the destroyed embedded data 28) may be transferred to the receiving device 14 in process block 174.

As will be understood by one of ordinary skill in the art, the processors 20, 50, 60 of the host device 12, receiving device 14, and predetermined server 18 may have various implementations. For example, each of the processors 20, 50, 60 may include any suitable device, such as a programmable circuit, integrated circuit, memory and I/O circuits, an application specific integrated circuit, microcontroller, complex programmable logic device, other programmable circuits, or the like. Each of the processors 20, 50, 60 may also include a non-transitory computer readable medium, such as random access memory (RAM), a read-only memory (ROM), an erasable programmable read-only memory (EPROM or Flash memory), or any other suitable medium. Instructions for performing the methods described above may be stored in the non-transitory computer readable medium and executed by the respective processor 20, 50, 60 identified in the description of the method. Each of the processors 20, 50, 60 may be communicatively coupled to the respective computer readable medium 22, 52, 62 and network interface 42, 54, 68 through a system bus, mother board, or using any other suitable structure known in the art.

The network interfaces 42, 54, 68 of the host device 12, receiving device 14, and predetermined server 18 may each be communicatively coupled to one or more other host devices 12, receiving devices 14, and predetermined servers 18 via a network 44. The network 44 may be an open network, such as the Internet, a private network, such as a virtual private network, or any other suitable network. Each of the network interface 42, 54, 68 may be configured to transmit and/or receive data structures 24.

As will be understood by one of ordinary skill in the art, each of the network interfaces 42, 54, 68 may comprise a wireless network adaptor, an Ethernet network card, or any suitable device for performing network based communication between devices. Each of the network interface 42, 54, 68 may be communicatively coupled to the respective computer readable medium 22, 52, 62 such that each network interface 42, 54, 68 is able to send data stored on the respective computer readable medium 22, 52, 62 across the network 44 and store received data on the respective computer readable medium 22, 52, 62. Each of the network interface 42, 54, 68 may also be communicatively coupled to the respective processor 20, 50, 60 such that the processor is able to control operation of the network interface 42, 54, 68. The respective network interfaces 42, 54, 68, computer readable medium 22, 52, 62, and processors 20, 50, 60 may be communicatively coupled through a system bus, motherboard, or using any other suitable manner as will be understood by one of ordinary skill in the art.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A system for securing electronic data, the system comprising:
   a non-transitory computer readable medium of an accessing device storing an executable program configured to be executable by a processor of the accessing device; and
   a non-transitory computer readable medium of a host device storing a data structure, the data structure comprising:
   an identifier;
   embedded data accessible only by first executing the executable program, wherein:
   the executable program when executed determines if the accessing device attempting to access the embedded data has permission to access the embedded data;
   if the accessing device is determined not to have permission to access the embedded data, the executable program destroys the embedded data; and
   if the accessing device is determined to have permission to access the embedded data, the executable program allows the host device to access the embedded data; and
   a sensor device positioned between a receiving device and the host device to detect the data structure when transmitted from the host device to the receiving device outside of the predefined area, wherein, during the transmission of data, the sensor device is configured to:
   receive the data structure during transmission from the host device to the receiving device;
   detect the identifier of the received data structure;
   access a permission table associating each of a plurality of identifiers with a permission regarding transmission and determine a permission associated with the identifier;
   when the permission associated with the identifier indicates that the data structure is permitted to be transmitted to the receiving device, transmit the received data structure to the receiving device; and
   when the permission associated with the identifier indicates that the data structure is not permitted to be transmitted to the receiving device, destroy the embedded data by overwriting the embedded data.

2. The system of claim 1, wherein the executable program is embedded in the data structure.

3. The system of claim 2, wherein:
   the sensor device destroys the embedded data by setting a flag of the data structure to an armed state; and
   the executable program destroys the embedded data if the flag is set to an armed state.

4. The system of claim 3, wherein:
   the sensor device allows the data structure to be transmitted to the receiving device by setting the flag of the data structure to a disarmed state; and
   the executable program allows the embedded data to be accessed if the flag is set to the disarmed state.

5. The system of claim 4, wherein the flag is set by default to the armed state.

6. The system of claim 4, wherein the flag is set by default to the disarmed state.

7. The system of claim 1, wherein:
   the executable program determines if the accessing device has permission to access the embedded data by:
   determining at least one of an identity or a location of the accessing device attempting to access the embedded data; and
   determining a permission associated with the identifier;
   if the permission associated with the identifier indicates that the data structure is permitted to be accessed by the accessing device, then the executable program allows the embedded data to be accessed; and
   if the permission associated with the identifier indicates that the data structure is not permitted to be accessed by the accessing device, then the executable program destroys the embedded data.

8. The system of claim 7, wherein the executable program determines the permission associated with the identifier by:
   connecting to a predetermined server; and
   accessing a permission table stored on the predetermined server, wherein the permission table associates each of a plurality of identifiers with a permission regarding access.

9. The system of claim 1, wherein, when the executable program is executed by the accessing device and the executable program determines that the accessing device does not have permission to access the embedded data, then the executable program determines an identity of the accessing device and transfers the identity of the accessing device to a predetermined server.

10. The system of claim 1, wherein the embedded data is destroyed by setting each bit of the embedded data to zero or one.

11. The system of claim 1, wherein the embedded data is destroyed by overwriting each bit of the embedded data with random data.

12. The system of claim 1, wherein the embedded data is destroyed by first setting each bit of the embedded data to zero or one and then overwriting each bit of the embedded data with random data.

13. The system of claim 1, further comprising a network for transferring the data structure between the host device and the receiving device.

14. The system of claim 13, wherein the sensor device comprises a packet analyzer.

15. The system of claim 13, wherein the network comprises at least one of a TCP/IP network or a system bus.

16. The system of claim 1, wherein the predefined area is a local area network.

17. A method for securing electronic data, the method comprising:

embedding data to be secured in a data structure such that the embedded data is not accessible without first executing an executable program, wherein the data structure is stored in a non-transitory computer readable medium of a host device;

determining if an accessing device has permission to access the embedded data;

if the accessing device is determined not to have permission to access the embedded data, destroying the embedded data;

if the accessing device is determined to have permission to access the embedded data, allowing the accessing device to access the embedded data;

transmitting the data structure to a receiving device outside of a predefined area;

during transmission of the data structure:

receiving the data structure using a sensor device positioned between the receiving device and the host device;

detecting using the sensor device an identifier of the data structure;

accessing a permission table associating each of a plurality of identifiers with a permission regarding transmitting and determining a permission associated with the identifier;

when the permission associated with the identifier indicates that the data structure is permitted to be transmitted to the receiving device, transmitting the received data structure from the sensor device to the receiving device; and when the permission associated with the identifier indicates that the data structure is not permitted to be transmitted to the receiving device, destroying the embedded data by overwriting the embedded data.

\* \* \* \* \*